United States Patent
Choi

(10) Patent No.: US 9,805,617 B2
(45) Date of Patent: Oct. 31, 2017

(54) SYSTEM FOR SCREEN DANCE STUDIO

(76) Inventor: Hae-Yong Choi, Seoul (KR)

(*) Notice: Subject to any disclaimer, the term of this patent is extended or adjusted under 35 U.S.C. 154(b) by 891 days.

(21) Appl. No.: 12/893,631

(22) Filed: Sep. 29, 2010

(65) Prior Publication Data
US 2012/0079555 A1  Mar. 29, 2012

(51) Int. Cl.
G03B 21/28 (2006.01)
G09B 19/00 (2006.01)

(52) U.S. Cl.
CPC ...... *G09B 19/0015* (2013.01); *A63B 2244/22* (2013.01); *G03B 21/28* (2013.01)

(58) Field of Classification Search
CPC ........ A63B 2244/22; A63B 2024/0012; A63B 69/0028; A63B 69/0071; A63B 69/3623; A63B 69/38; A63B 69/36; A63B 2225/12; A63B 24/0003; A63B 69/00; A63B 2209/08; A63B 2209/10; A63B 2210/00; A63B 60/54; G03B 21/28; G09B 19/0015; G09B 5/02; G02B 6/02085; G02B 6/255; G11C 13/04
USPC ....... 434/250, 314, 247; 345/8, 81; 725/139; 477/266; 473/266
See application file for complete search history.

(56) References Cited

U.S. PATENT DOCUMENTS

| | | | | |
|---|---|---|---|---|
| 2,494,000 | A * | 1/1950 | Robertson | 434/257 |
| 4,015,344 | A * | 4/1977 | Michaels et al. | 434/257 |
| 2002/0186221 | A1* | 12/2002 | Bell | 345/474 |
| 2006/0094523 | A1* | 5/2006 | Hall | A63B 69/3623 473/266 |
| 2007/0069977 | A1* | 3/2007 | Adderton | 345/8 |
| 2009/0136157 | A1* | 5/2009 | Ayala et al. | 382/284 |
| 2010/0190610 | A1* | 7/2010 | Pryor et al. | 482/8 |
| 2012/0134695 | A1* | 5/2012 | Slivniak-Zozin et al. | 399/53 |

FOREIGN PATENT DOCUMENTS

KR  WO 2008007853 A1 * 1/2008 ............ A63B 69/36

* cited by examiner

*Primary Examiner* — Eddy Saint-Vil
(74) *Attorney, Agent, or Firm* — Bacon & Thomas. PLLC

(57) ABSTRACT

A system for an exercise screen dance studio includes an image storage unit, an audio unit, a controller, a large mirror, a projector, a screen image unit, and a left-right image reversal unit for reversing left-right sides of an image. In addition, a screen image unit is provided either behind a trainee dancer with a large mirror being provided in front of the trainee or the screen image unit can be integrated with the large mirror. A large screen image unit and a projector for proving audio and image may be provided, wherein the large mirror is arranged in front of the trainee and the screen image unit is placed on a rear side thereof or inside the mirror so that the trainee can see simultaneously his/her reflected exercising image and the projected dance exercising image through the mirror in the same orientation with regard to left-right sides or as a reversed image.

3 Claims, 8 Drawing Sheets

Fig.3
(a)
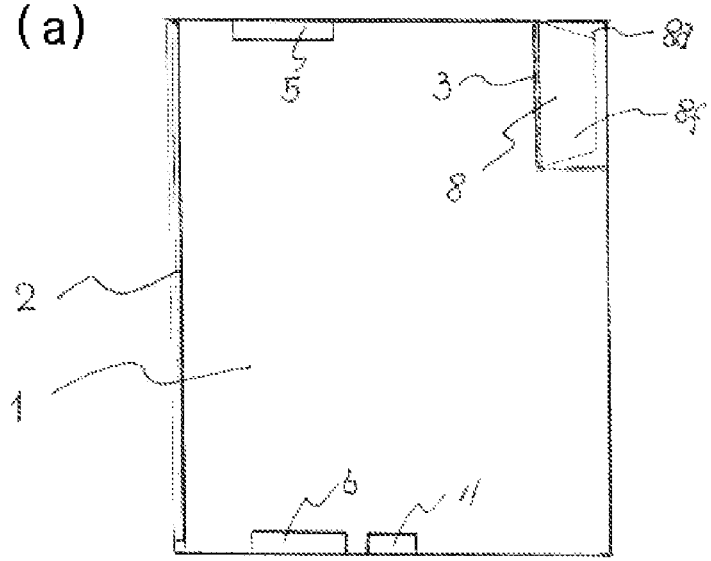
(b)
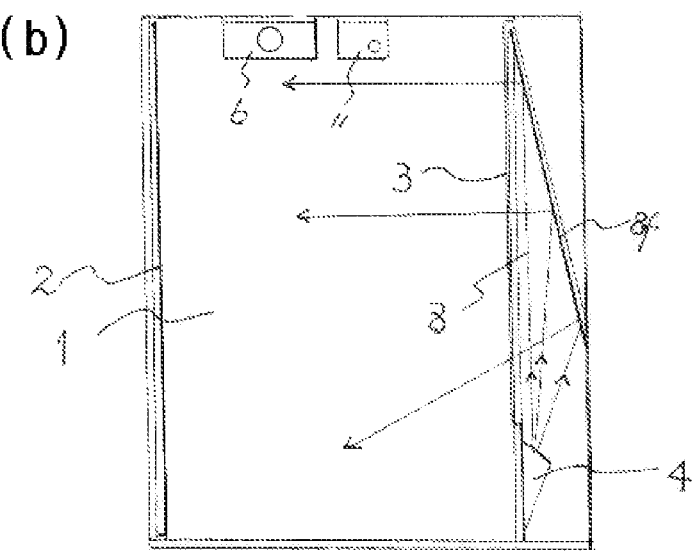

Fig.6
(a)
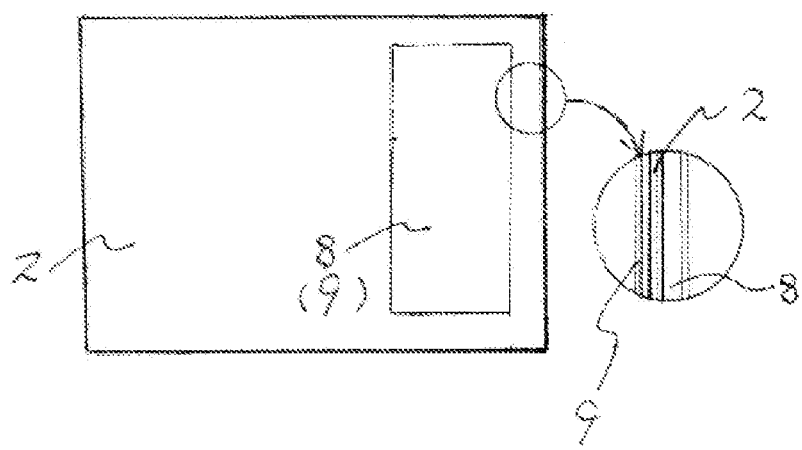
(b)
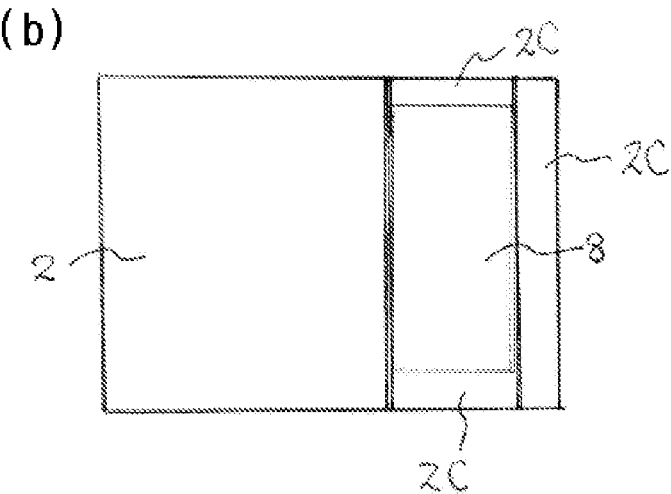
PRIOR ART

Fig.8
(a)
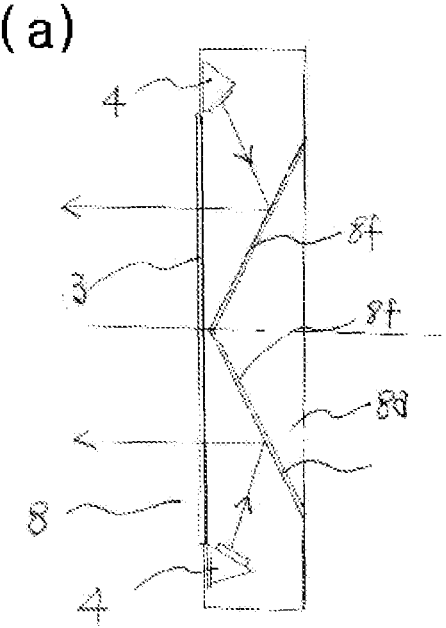
(b)
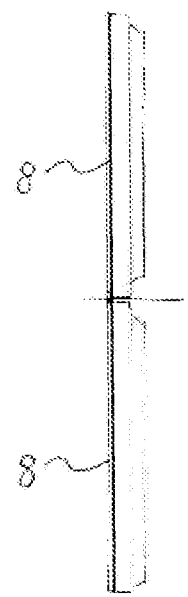

SYSTEM FOR SCREEN DANCE STUDIO

BACKGROUND OF THE INVENTION

1. Field of the Invention

The present invention relates to a screen dance studio system that enables a person to perform exercise dancing while seeing his/her image both displayed on a screen and reflected in a mirror.

2. Description for the Related Art

Generally, prior dance exercising systems are in the field of game arrangements using footsteps and do not relate to teaching and learning traditional dance.

Meanwhile, dances may be classified in various ways, such as sports dancing, broadcasting dancing and social dancing, etc., wherein the dancing is a kind of aerobic exercise using the whole body, essential for modern social life, and further constitutes an important exercising choice.

This kind of dancing need a long training time period and further when many students in a dance class learn dancing over a predetermined time period, a teacher must be provided and the students have to be trained uniformly regardless of their ability under a predetermined dancing program. In addition, when the teacher teaches his/her students, the teacher has to show his/her back side to the students in order to make movements conforming with those of the students, instead of facing them.

SUMMARY OF THE INVENTION

One object of the present invention relates to a system for a screen dance studio wherein a person can perform exercise dancing at a predetermined place and at a convenient time, and further he/she can dance while seeing a large screen image of oneself without a teacher. At this time, he/she can select the image and the audio depending on his/her progress and a new popular dance can be provided as an image with audio and a further background, like a real stage that appears in the mirror, creating a realistic stage experience.

According to one embodiment of the present invention, as shown in FIG. 1, an exercising or dancing room 1 is provided with an image storage unit 5 and a large screen image unit 8 to enable a person to exercise dance while viewing the screen, wherein various dance exercising music is inputted and stored in the image storage unit 5 and the music is selected through the control box 11 depending on his/her level or preference. Additionally, a background image of the image storage unit 5 enables an image to be shown on the large screen and the large mirror 2. Meanwhile, an audio unit 6 provided with the image storage unit 5 and a speaker is provided inside the exercising room 1, while a trainee 7 can dance while seeing his/her reflected exercising dance action in the mirror and the image from the screen image unit 8, which is corrected for left-right sides, also in the single mirror 2.

According to another embodiment of the present invention, as shown in FIG. 1, the dance image provided by the screen image unit 8 is provided as the same size as a dance teacher with his/her exercising action, with the dance exercising image from the screen image unit 8 being shown simultaneously on the large mirror 2 so that it appears that a real teacher is teaching. In addition, referring to the teacher's action and the image from the screen image unit 8 shown in the mirror 2, respective left-right sides are same so that a trainee can imitate the image action reflected on the mirror. Meanwhile, an exercising program or routine stored in the image storage unit 5 can be selected and used through the control box 11 and new or other images can be stored by the image storage unit. Here, the image stored in the image storage unit 5 appears using a stage background image, proving a realistic stage experience. A trainee 7 can select various dance exercising programs at a convenient time and exercise dance without a teacher, depending on his/her dancing ability.

BRIEF DESCRIPTION OF THE DRAWINGS

FIG. 3(a) shows schematically an image box of the screen image unit.

FIG. 3(b) shows in section the image box.

FIG. 6(a) shows schematically the mirror and the screen image unit.

FIG. 6(b) shows schematically a prior art mirror.

FIG. 8(a) shows schematically upper and lower parts of a transparent screen image unit.

FIG. 8(b) shows schematically upper and lower parts of a plain screen configuration.

DETAILED DESCRIPTION OF THE PREFERRED EMBODIMENTS

Figure 1:
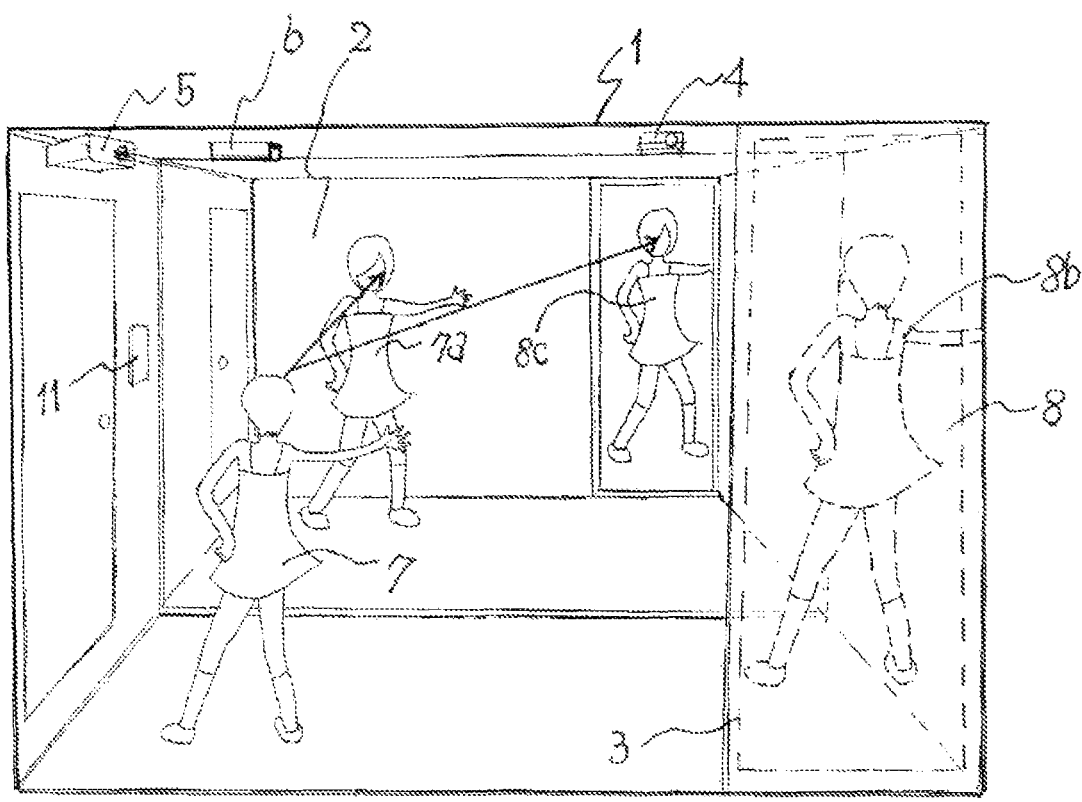
FIG. 1 shows schematically an embodiment of a dance exercising room according to the present invention.
Figure 2:
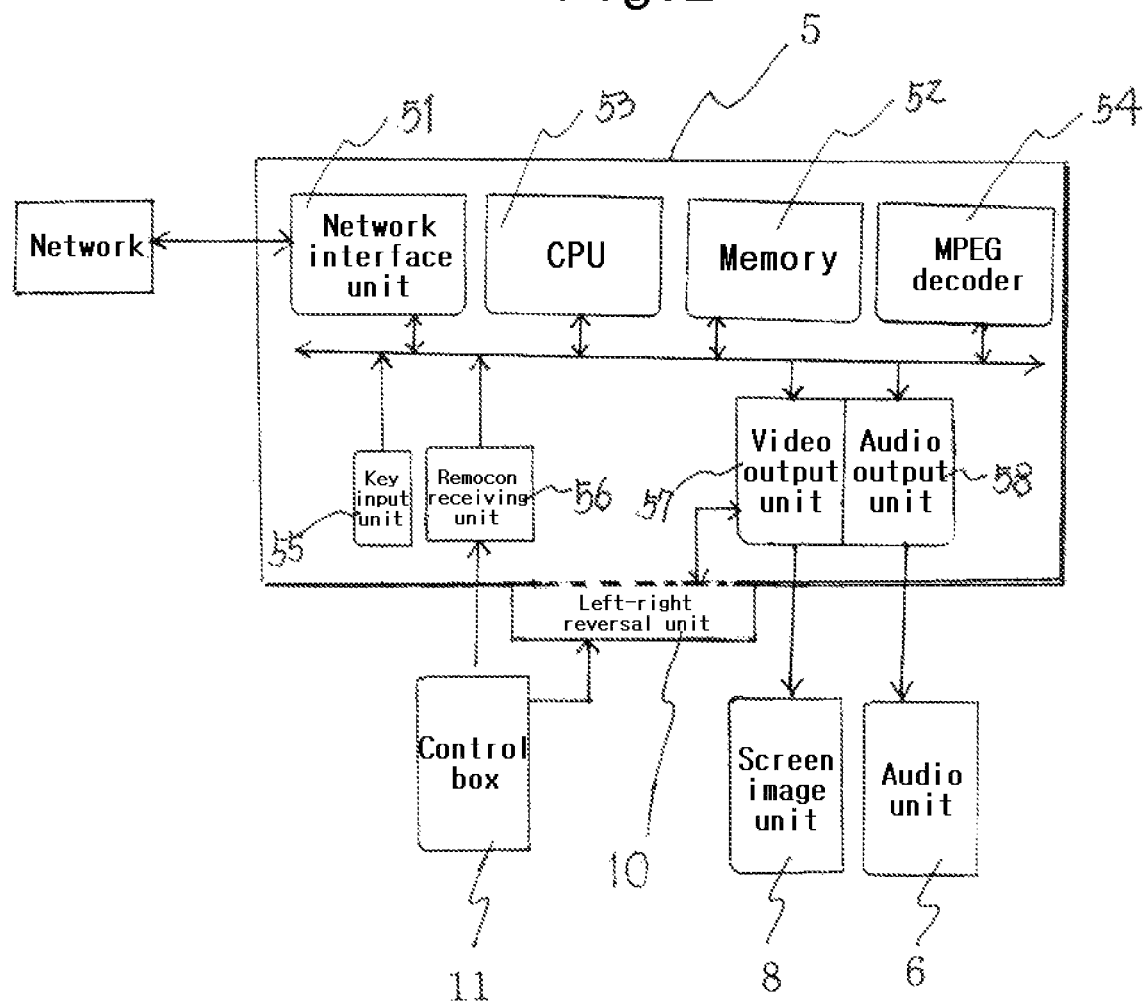
FIG. 2 shows schematically one embodiment of an image storage unit according to the present invention.

The system for screen exercise dance studio comprises, as shown in FIGS. 1 and 2, an exercising room 1 with opposed walls, a large mirror 2 for reflecting the inside of an exercising room 1, an image storage unit 5, a projector 4 for projecting an image from the image storage unit, a large screen 3 on a wall of the room for displaying the projected image, a screen image unit 8 in the form of a flat screen such as LCD (Liquid Crystal Display) or PDP (Plasma Display Panel), an audio unit 6 for amplifying audio signal outputted from the image storage unit 5, comprising a speaker and audio amplification unit, a controller 11 for controlling the image storage unit 5 and a left-right reversal unit 10 for reversing left-right sides of the image. Here, the image storage unit 5 comprises VOD (Video On Demand) and a setup box, etc, and since the image storage unit 5 using VOD comprises the setup box for storing image and audio data, it provides dance exercising images. Audio from the VOD as a musical unit is stored on a hard disc through communication contact or memory. The stored dance exercising image in the hard disc can be selected by a user through the controller 11. In addition, the image storage unit 5 may comprise a Blu Ray player for Blu Ray discs and in this case the left-right reversal unit 10 has to be added and further the dance exercising image may be provided on a CD (Compact Disc) that may be selected by a trainee.

Meanwhile, the left-right reversal unit 10 embeds a program for reversing the left-right sides of the stored image and may be controlled from the controller 11 to reverse the left-right sides of the screen image, if necessary or desired.

FIG. 2 shows one preferred configuration of the image storage unit 5 according to the present invention, wherein a network interface 51 may be provided in a separate unit for communication contact or inputting memory, and further a memory 52, CPU 53, MPEG decoder 54, key input part 55 and remocon (remote control) receiving unit 56 are provided. Here, the remocon receiving unit 56 receives remote control from the control box 11 and further a video output unit 57 and an audio output unit 58 are provided and the video output unit 57 is connected to the screen image unit 8 and the audio output unit 58 is connected to audio unit 6.

Additionally, referring to VOD, data about menu selection is supplied from a video server and the image is processed in the setup box and then the picture outputted to the screen image unit 8, with the audio outputted to the audio unit 6 comprising an amp and a speaker.

Another preferred image storage unit 5 according to the present invention is configured such that digital image and audio data are stored in the form of audio data and image data corresponding to standards of MIDI (Musical Instrument Digital Interface). The corresponding audio data and image data, depending on music selection, are extracted and then the audio data is reproduced as audio signal through an audio source processing device to be outputted to the audio unit 6 and further the image data is outputted to the projector 4 to be shown on the screen image unit 8.

The image storage unit 5 is configured such that, as shown in FIG. 2, the left-right reversal unit 10 is provided between the video output unit 57 and the control box 11. Here, the left-right reversal unit 10 is configured such that image projection direction projected from left side to right side is reversed such as with a mirror effect and it may be controlled through the control box 11 by a switch conversion method or program. In addition, the image storage unit 5 may be in the form of a separate box. That is, the screen image unit 8, the audio unit 6, together with the image storage unit 5, may be housed separately, resulting in improved installation efficiency.

The audio unit 6 for amplifying the audio may be included with the image storage unit 5, or may be provided separately. In summary, various dance exercising images, together with corresponding music, may be inputted and stored and then selected through the control box 11 depending on trainee's level or preference.

Figure 4:
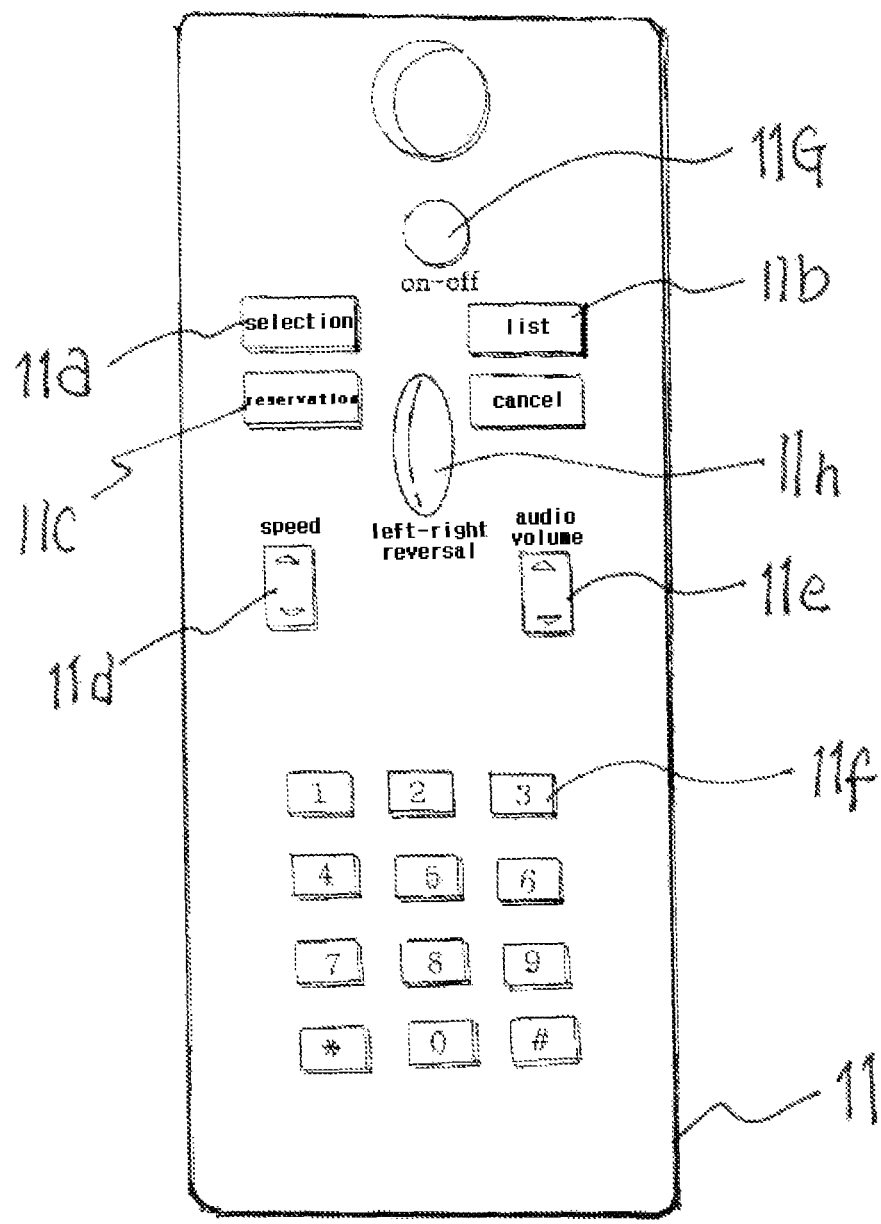
FIG. 4 shows a schematic configuration of the control box.

In addition, the control box 11 preferably is configured as a single unit such that, as shown in FIG. 4, a switch 11G for on-offing the image storage unit 5 is provided on an upper part thereof, and a number key 11f and selection key 11a for designating numbers for a dance list, and a list having key 11b for showing the list and the numbers of dance exercising music and a reservation key 11c for reserving the music are provided. Meanwhile, a tempo control key 11d for adjusting the tempo of the selected music, such as slow or rapid, and a volume key 11e for adjusting sound volume, may be provided. Further, a reversal key 11h for reversing the left-right sides of the image may be provided. Here, the control box 11 may be located inside the exercising room 1.

The screen image unit 8 for implementing the image on the screen 3 is preferably configured as followings.

A projector 4 having a relative short projection distance is provided inside the exercising room 1 and the screen 3 is formed as a mirror screen or rear screen receiving and displaying the projected image.

Additionally, as shown in FIGS. 3a and 3b, a screen box 8a may be provided inside the exercising room 1 and a transmissive screen 3 may be provided on front face thereof, and further a projector 4 may be provided on lower end or upper end of the screen box 8a. Here, a mirror 8f may be provided inclined from the upper end to lower end.

The aforementioned screen image unit 8, as shown in FIG. 8a, may formed as a transmissive screen 3, and further width to length picture ratios of lower-upper 2 step type may be 4:3 or 16:9, or pictures may be formed 8:3 or 32:9 as 2 step of lower and upper side, or may be formed 4:6 or 16:18 as 2 steps of left and right sides. Alternatively, as shown in FIG. 8b, the screen may be formed as plain a screen display configuration such as PDP or LCD.

Referring to an overall arrangement of the screen image unit 8, as shown in FIG. 1, the exercising room 1 having a proper area for personal dance exercising is provided and further a large mirror 2 is provided in front of the trainee 7 and the screen image unit 8 is provided on one rear side of the trainee.

In addition, the audio unit 6 and the image storage unit 5 are provided on left and right sides of the exercising room 1 and the control box 11 is provided inside the exercising room 1.

With respect to the operation of the system, inside the exercising room, as shown in FIG. 1, the trainee dancer operates the screen image unit 8 to display dance exercising image 8b to be reflected on the facing mirror 2, and then the reflected exercising image 8c is shown and at the same time the exercising picture 7a of the trainee 7 is shown on the mirror 2.

That is, the trainee 7 can see simultaneously the reflected projected exercising image 8c and the reflected image 7a of the trainee 7 on the front mirror 2, and in particular the trainee 7 can see the same left-right sides of the reflected exercising image 8c and the image 7a of the trainee 7, instead of opposite sides thereof. Accordingly, the trainee can exercise dance in response to the music.

More specifically, a large mirror 2, as shown in FIG. 1, refers to a mirror of the size that can reflect the entire area of the interior so that a trainee 7 can simultaneously see while comparing a dance teaching image 8b provided from a screen onto the facing mirror and reflected from the large mirror 2 with the exercising FIG. 7a of a trainee 7.

The aforementioned configuration further may be implemented according to the following embodiments.

First Embodiment

Figure 5:
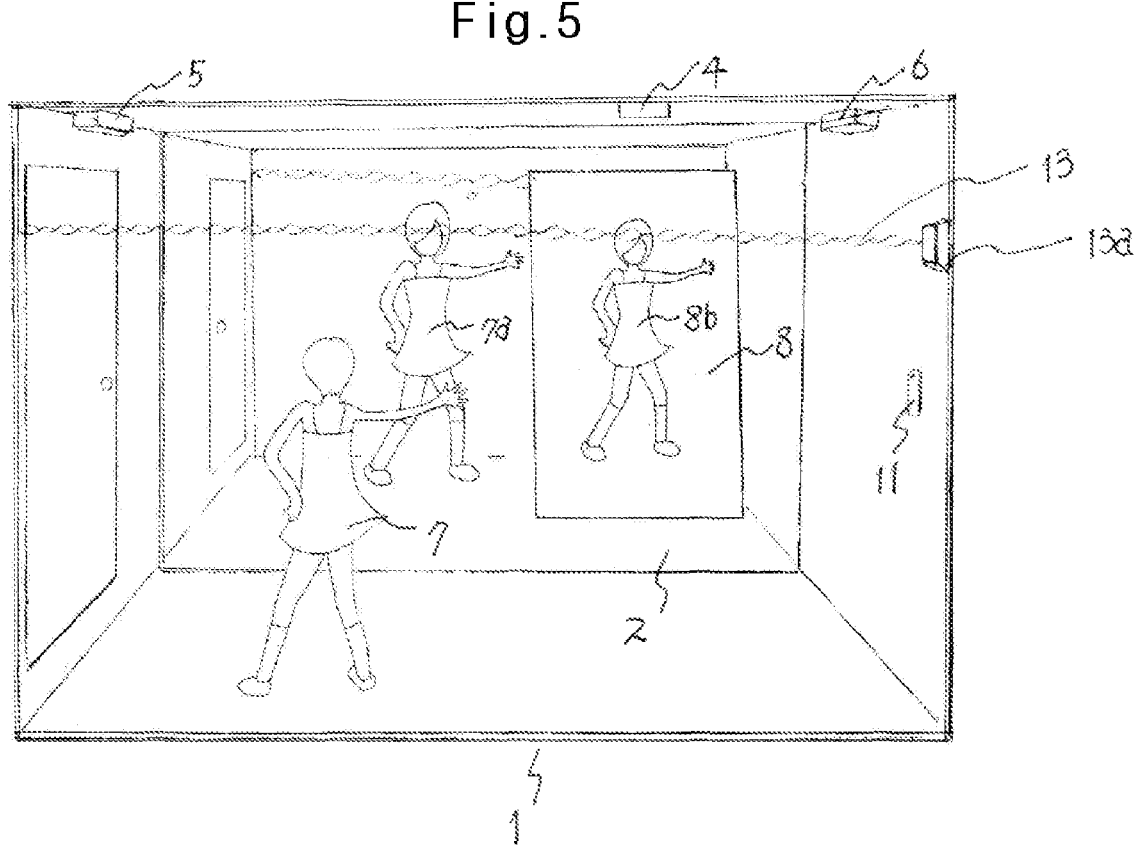
FIG. 5 shows schematically another embodiment of the dance exercising room.

As shown in FIG. 5, the exercising room 1 having a proper area for personal dance exercising is provided and further a large mirror 2 is provided facing into the exercising room 1, with the screen image unit 8 being provided on one side of and on the same wall as the large mirror 2. In addition, the audio unit 6 and the image storage unit 5 are provided on left and right sides of the exercising room 1 and the controller 11 is provided inside the exercising room 1. At this time, the dance exercising image 8b shown in the mirror 2 is displayed in a state of the left-right sides being reversed with the left-right sides of the image being reversed through the left-right reversal unit 10.

Second Embodiment

Figure 7:
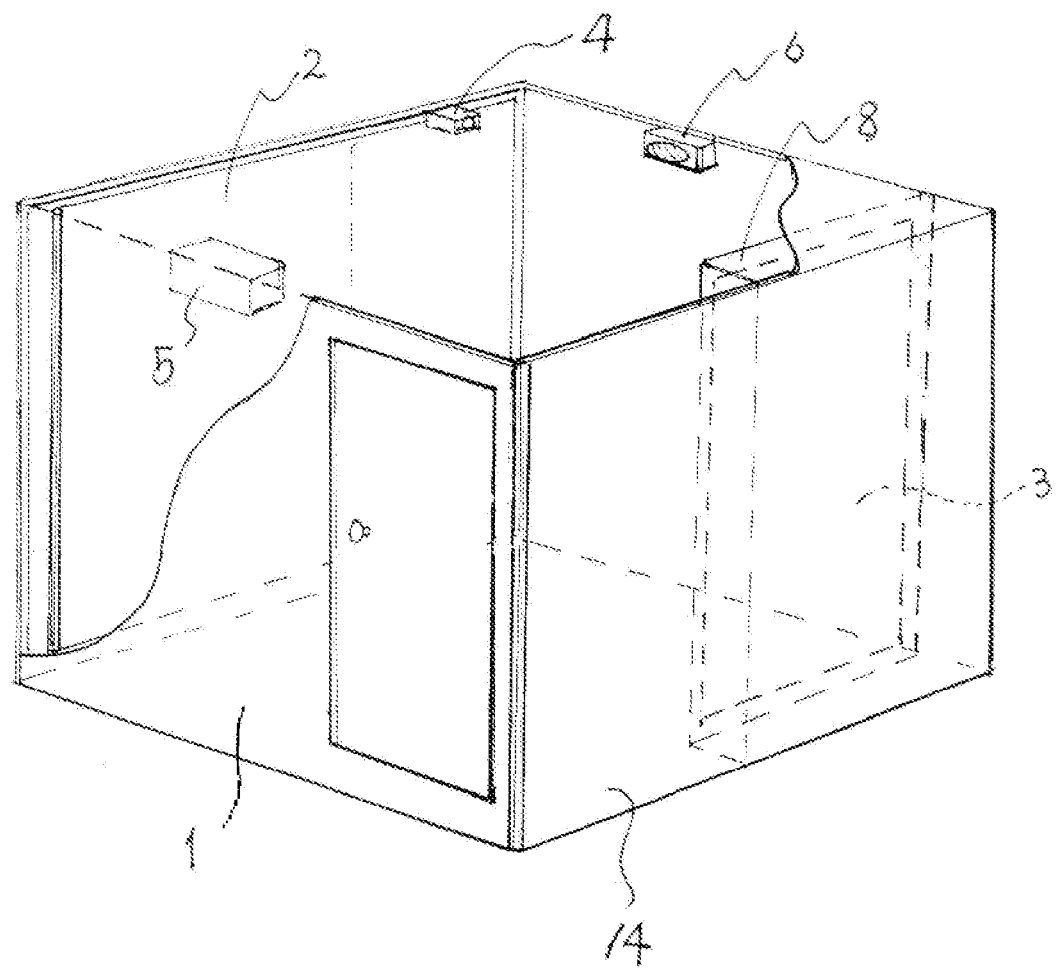
FIG. 7 shows schematically an outer view of a kiosk embodiment.

The system for screen dance studio according to the present invention also may be in the form of a movable kiosk 14, as shown in FIG. 7.

That is, a kiosk 14 having a proper area for exercise dancing may be provided and a large mirror 2 may be provided on one inside wall of the kiosk. Here, the screen image unit 8 may comprise a plain image unit such as a screen 3, with the projector 4 or PDP provided facing one side of the large mirror 2 and further with the audio unit 6 and the image storage unit 5 provided on the respective left and right ends inside the kiosk 14, and with the controller 11 also provided inside the kiosk.

Accordingly, since the system for the screen dance studio is formed as a kiosk 14, there is no need for installing a sound proof wall and further size reduction is possible, causing production cost to be decreased. Meanwhile, a manufacturer can efficiently fabricate the system as the kiosk 14 unit and an installer can easily move the system as a kiosk unit and assemble it easily, thereby avoiding separate interior work.

Third Embodiment

As shown in FIGS. 5 and 6, the screen image unit 8 may be added to the inside of the mirror 2 and thus the mirror 2 and the screen image unit may be integrated.

That is, the screen image unit 8 may be bonded to the inside of single plate mirror 2. As shown in FIG. 6(*a*). When a separate reflection mirror 2*c* is connected to upper and lower parts, or left and right sides, respectively separated, from the screen image unit 8, as shown in prior mirrors like FIG. 6(*b*), the reflection angle of the respective separation reflection mirror 2*c* is different, and thus it needs much time and effort to create a single reflection angle and further joining of the respective reflection mirror appears to decrease uniformity of single plate mirror. Accordingly, through the configuration as shown in FIG. 6(*a*) the aforementioned drawback can be solved.

The aforementioned single plate mirror may be configured as shown in FIGS. 8(*a*) and 8(*b*), that is, the screen image unit 8 is configured such that a reflection screen (not shown) is provided inside of the single plate 2 and the projector and screen are provided on a front face of the single plate mirror. Through this single plate mirror 2, a single reflection angle can be obtained and thus image and actions of the trainee reflected on the mirror are integrally shown as single image without difference.

Fourth Embodiment

As shown in FIG. 6(*a*), a semi-transparent mirror 9 may be bonded to a front face of the mirror 2 to which the screen image unit is connected, that is, to a front face of the screen image unit 8, so that when the screen image unit is operated, the image is shown, and further when it is not operated, the front plate becomes a mirror. Here, the semi-transparent mirror 9 refers to as a mirror from which a part of incident light is reflected and a part thereof is transmitted. Using this property of the semi-transparent mirror 9, when the screen image unit is operated, a rear face of the semi-transparent mirror 9 becomes bright and the image is shown through the semi-transparent mirror 9, and when the screen image unit 8 is turned-off, the rear face of the semi-transparent mirror becomes dark, and the semi-transparent mirror 9 on the front functions as simple mirror. Accordingly, with this configuration, the image and mirror both are viewable and, if necessary, the whole configuration can be used as a mirror. Additionally, the configuration of the screen image unit 8 may be added to as shown in FIGS. 8(*a*) and 8(*b*).

Fifth Embodiment

As shown in FIG. 5, lighting (e.g., lamp) 13 may be provided on a rear face or side wall facing the trainee 7 and the lighting is connected to a sound sensor 13*a*. In this manner, the brightness of the lighting 13 may be changed depending on the rhythm of the music and may be reflected in the mirror.

Sixth Embodiment

According to the another preferred embodiment of the present invention, the image storage unit 5 is provided with background images. Dance exercising pictures are prepared in the form of a stage background, dancing hall, seashore, party place, etc., and the large mirror 2 is provided on a wall in front of the trainee 7. The screen image unit 8, which is larger than the mirror and comprises the screen 3, the projector 4 and PDP or LCD, are provided on a wall rearward of the trainee. With this configuration, a background image on the screen may be provided largely behind the trainee 7 and reflected on the large mirror 2 provided in front of the trainee 7, so that the trainee 7 feels as if he/she is standing on a real stage, that is, a real stage feeling can be obtained. In this case, the trainee feels as of he/she is standing in the middle of a stage or dancing hall, and the trainee can choose a background picture depending on his/her preference. If necessary, he/she can dance while viewing the dance exercising picture, or select only the background and music for exercising.

While the present invention is described referring to the preferred embodiment, the present invention is not limited thereto, and thus various variation and modifications can be made without departing from a scope of the present invention.

What is claimed is:

1. A system for a screen dance studio in which left-right sides of a dance exercising image are able to be simultaneously compared with left-right sides of an Image of a trainee dancing comprising:

a dance exercising room in which the trainee is able to exercise having an audio unit and an image storage unit;

a combined mirror and screen image unit arranged on a front wall face of the dance exercising room, wherein the screen image unit is bonded to an interior of the mirror;

an area provided between the front wall face and a rear wall face of the dance exercising room in a way such that the trainee is able to exercise in the dance exercising room, wherein a semi-transparent mirror is provided on a front surface of the combined mirror and the screen image unit in a way such that a part of incident light is reflected and a part thereof is transmitted such that when the dance exercising image on the screen image unit is on, the dance exercising image of the screen image unit transmits through the semi-transparent mirror to be viewed by the trainee so that the trainee is able to dance while viewing simultaneously his/her dance image reflected from the mirror and the dance exercising image provided from the screen image unit at a same angle of reflection, and when the dance exercising image of the screen image unit is off, the semi-transparent mirror serves as a mirror;

and a left-right reversal unit that embeds a program for reversing the left-right sides of the dance exercising image of the screen image unit, wherein the trainee is able to exercise dance by viewing simultaneously the left-right sides of his/her dance image reflected from the mirror with the left-right sides of the dance exercising image of the screen image unit.

2. The system according to claim 1, wherein a reflection screen is provided at an incline from an upper end to a lower end inside the combined mirror and screen image unit, and wherein the screen image unit comprises a projector and a planar screen arranged in a way such that the projector projects an image reflected off the reflection screen onto the planar screen.

3. The system according to claim 1, wherein the screen image unit is a LCD.

\* \* \* \* \*